US005373865A

United States Patent [19]

Jung et al.

[11] Patent Number: 5,373,865

[45] Date of Patent: Dec. 20, 1994

[54] NON-LEAKING STORAGE CHARGING VALVE

[75] Inventors: Rüdiger Jung, St. Ingbert; Harald Bär, Völklingen-Luisenthal, both of Germany

[73] Assignee: Flutec Fluidtechnische Gerate GmbH, Sulzbach/Saar, Germany

[21] Appl. No.: 84,215

[22] PCT Filed: Jan. 1, 1992

[86] PCT No.: PCT/EP92/00009

§ 371 Date: Aug. 23, 1993

§ 102(e) Date: Aug. 23, 1993

[87] PCT Pub. No.: WO92/12350

PCT Pub. Date: Jul. 23, 1992

[30] Foreign Application Priority Data

Jan. 4, 1991 [DE] Germany ............................ 4100071

[51] Int. Cl.⁵ ............................................ G05D 16/10

[52] U.S. Cl. .................................................... 137/116

[58] Field of Search ................................ 137/115, 116

[56] References Cited

U.S. PATENT DOCUMENTS

| | | | |
|---|---|---|---|
| 2,545,712 | 3/1951 | Stevenson . | |
| 2,737,966 | 3/1956 | Lucien . | |
| 3,024,732 | 3/1962 | Nyman . | |
| 3,329,153 | 7/1967 | Henry-Biabaud . | |
| 4,114,637 | 9/1978 | Johnson | 137/116 |
| 4,603,708 | 8/1986 | Altmann | 137/116 |

FOREIGN PATENT DOCUMENTS

| | | |
|---|---|---|
| 1319685 | 1/1983 | France . |
| 1043819 | 11/1958 | Germany . |
| 1049704 | 1/1959 | Germany . |
| 3334189 | 4/1985 | Germany . |
| 965656 | 8/1964 | United Kingdom . |
| 1207085 | 9/1970 | United Kingdom . |

*Primary Examiner*—Robert G. Nilson

*Attorney, Agent, or Firm*—Roylance, Abrams, Berdo & Goodman

[57] ABSTRACT

The invention relates to an accumulator charging valve, which for the connection of an inlet P supplying a hydraulic system 10 to an outlet T when an adjustable upper charging pressure in the hydraulic system 10 is reached and for separating this connection when an adjustable lower charging pressure in the hydraulic system 10 is reached, is provided with a control piston 42, which in one of its two switching positions breaks the connection between the inlet P and outlet T and in the other switching position makes this connection. By means of a separating device, a control connection B connecting the hydraulic system 10 to the accumulator charging valve can be separated from the outlet T. On reaching the adjustable upper charging pressure, by means of at least one sealing part of the separating device, the connection forming a leakage point between the control connection B and the outlet T can be sealed hermetically. Due to this arrangement, inside the valve, in the range between the lower and the upper charging pressure, the hydraulic system 10 can be shut off in a completely non-leaking manner.

9 Claims, 2 Drawing Sheets

NON-LEAKING STORAGE CHARGING VALVE

Figure 1:
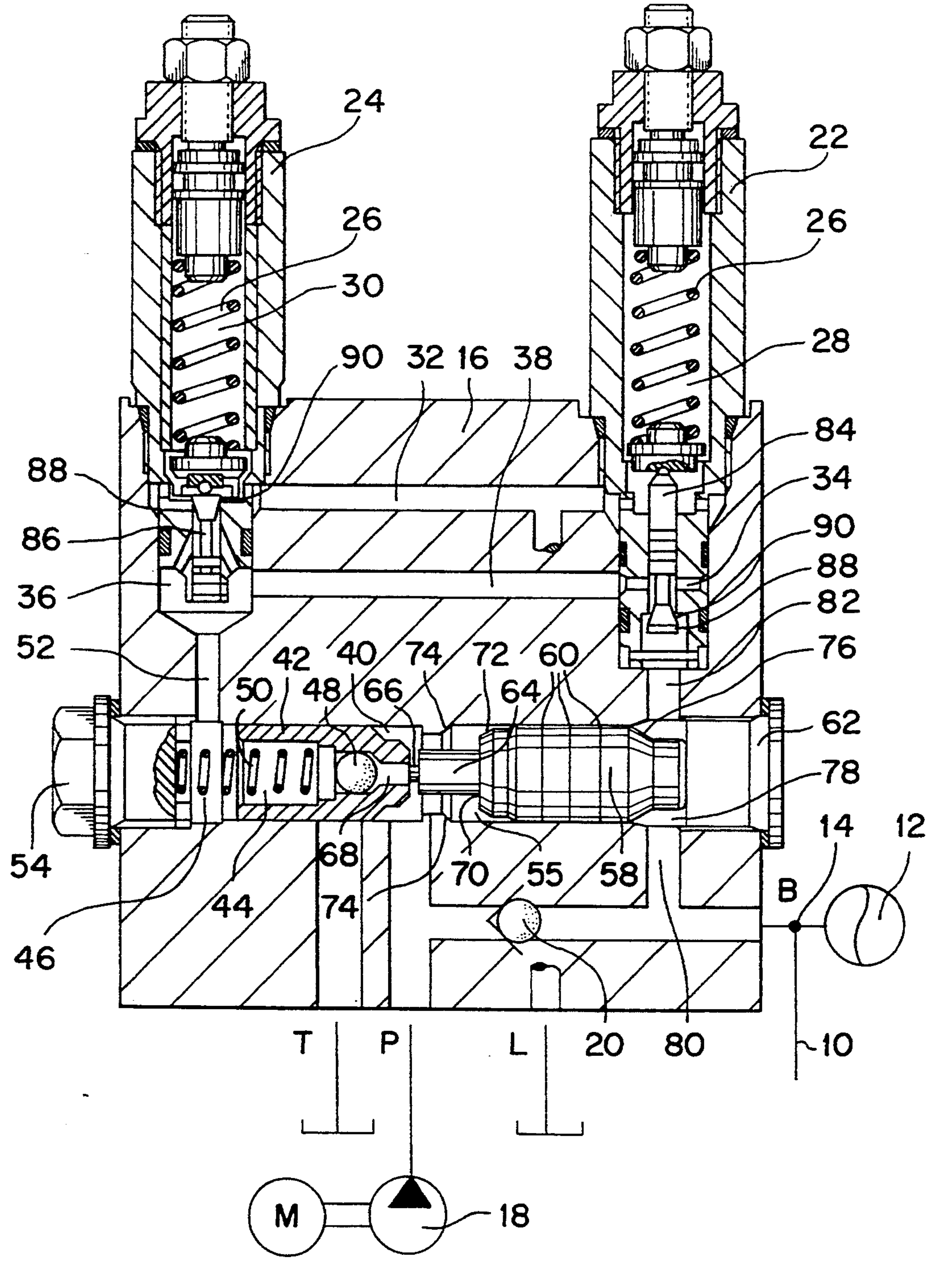

The invention relates to an accumulator charging valve, which for the connection of an inlet supplying a hydraulic system to an outlet when an adjustable upper charging pressure in the hydraulic system is reached and for separating this connection when an adjustable lower charging pressure in the hydraulic system is reached, is provided with a control piston, which in one of its two switching positions breaks the connection between the inlet and outlet and in the other switching position makes this connection, a control connection connecting the hydraulic system to the accumulator charging valve being separated from the outlet by means of a separating device.

Accumulator charging valves of this type, which are also known as disconnection valves, are normally used in hydraulic systems or hydraulic circuits, which comprise at least one hydraulic accumulator for keeping the pressure in the hydraulic system constant. The respective hydraulic accumulator in this case operates in a range between a lower and an upper charging pressure, whereof the respective pressure altitude is adjustable, thus can be freely selected. If the lower or the upper charging pressure is not reached or is exceeded, by means of the accumulator charging valve, the connection to the inlet ensuring the hydraulic oil supply is made or broken. The consequently adjustable difference between the lower and the upper charging pressure can be great, but can also adopt very low values.

An accumulator charging valve of the aforementioned general type has already been described in DE-PS 36 08 100. In this known accumulator charging valve, the lowest possible leakage rate within the valve should be achieved, in order to ensure that the respective hydraulic accumulator maintains the pre-set system pressure even over a relatively long period of time. This known accumulator charging valve has a control piston, one part of the piston, constructed as a separating device, in each switching position of the control piston which can be adopted, separating the connection between the control connection and the outlet, which opens into the tank. By way of an annular gap formed by this piston part, a leakage occurs between the control connection and the outlet leading to the tank. Thus the charging pressure in the accumulator is reduced, which causes the drawbacks described in DE-PS 36 08 100.

DE-OS 37 44 178 discloses a different type of embodiment of a hydraulic accumulator charging valve, which comprises a main piston and an anticipatory control supplied by way of a restrictor with pressure medium from the inlet, with an anticipatory control valve constructed as a seated valve, which after the opening achieved at the disconnecting pressure, is held in the open position by an unlocking piston and thus causes the disconnection position of the main piston and secures the latter until a lower connection pressure is reached. Thanks to this construction, at least when the outlet is under load, there is no longer any loss of control oil. For this purpose, a return flow of the fluid from a hydraulic accumulator connected to the accumulator charging valve is prevented by a closed non-return valve, which is located in the main piston, which comprises a stepped annular surface, which with the formation of a hermetically sealing seated valve can be brought into contact with a step located within the housing. Due to this the contents of the hydraulic accumulator can be closed off in a leakage-free manner.

Based on this prior art, it is the object of the invention to provide an accumulator charging valve with freely adjustable switching points, which operates reliably free from oil leakages so that the pressure in the hydraulic accumulator is kept constant even over a relatively long period of time. This object is achieved by an accumulator charging valve with the features of claim 1.

Due to the fact that in the accumulator charging valve according to the invention, with the features of the preamble of claim 1, on reaching the adjustable upper charging pressure, by means of at least one sealing part of the separating device, the connection forming a leakage point between the control connection and the outlet can be sealed hermetically free from oil leakages, there is no return flow of hydraulic oil from the "charged" respective hydraulic accumulator, in particular during the stoppage times of the hydraulic system, to the tank. Thus, the accumulator charging valve according to the invention however fulfils all the requirements of reliable operation of the connected hydraulic system.

Further advantageous embodiments of the accumulator charging valve according to the invention are the subject of the Sub-claims.

In a preferred embodiment of the accumulator charging valve according to the invention, the separating device comprises a closing piston cooperating with the control piston, which with one another form a pressure maintaining valve. This allows reliable operation of the accumulator charging valve, irrespective of the prevailing volumetric flows and viscosities.

In a further preferred embodiment of the accumulator charging valve according to the invention, the closing piston can be exposed on its working surface facing and remote from the control piston, to the pressure prevailing in the inlet or in the control connection and on its working surface facing the control piston comprises the closing part, which can be brought into contact with the stationary part, which is located between the inlet and control connection in the travelling space of the closing piston. Due to this, a defined sealing point is provided, by means of which a seal free from oil leakages is guaranteed between the control connection and the outlet on reaching the adjustable upper charging pressure. In addition, at least the control piston can be completely disconnected from the actual accumulator circuit of the hydraulic system.

In another preferred type of accumulator charging valve according to the invention, on reaching the upper charging pressure, the separating device with its respective sealing part is formed from the first anticipatory control valve and the check valve located between the inlet and the control connection. In this solution, a reliable seal free from oil leakages is also guaranteed.

In so far that this type of accumulator charging valve according to the invention has a passage on the control piston, which opens into the control chamber and which can be connected to a leakage oil line, it is possible to ensure, in particular when the system or parts of the system are stationary, that the respective hydraulic accumulator is always charged to the upper charging pressure, when operation is restored, even when the actually prevailing accumulator pressure is greater than the lower charging pressure which can be predetermined. Thus, in comparison with the known accumulator charging valves, in which renewed charging basically takes place solely on falling below the lower charging pressure, a defined charging state is always established in the hydraulic accumulator, which corresponds to the upper charging pressure, so that then the full accumulator capacity is available for the hydraulic system.

Figure 2:
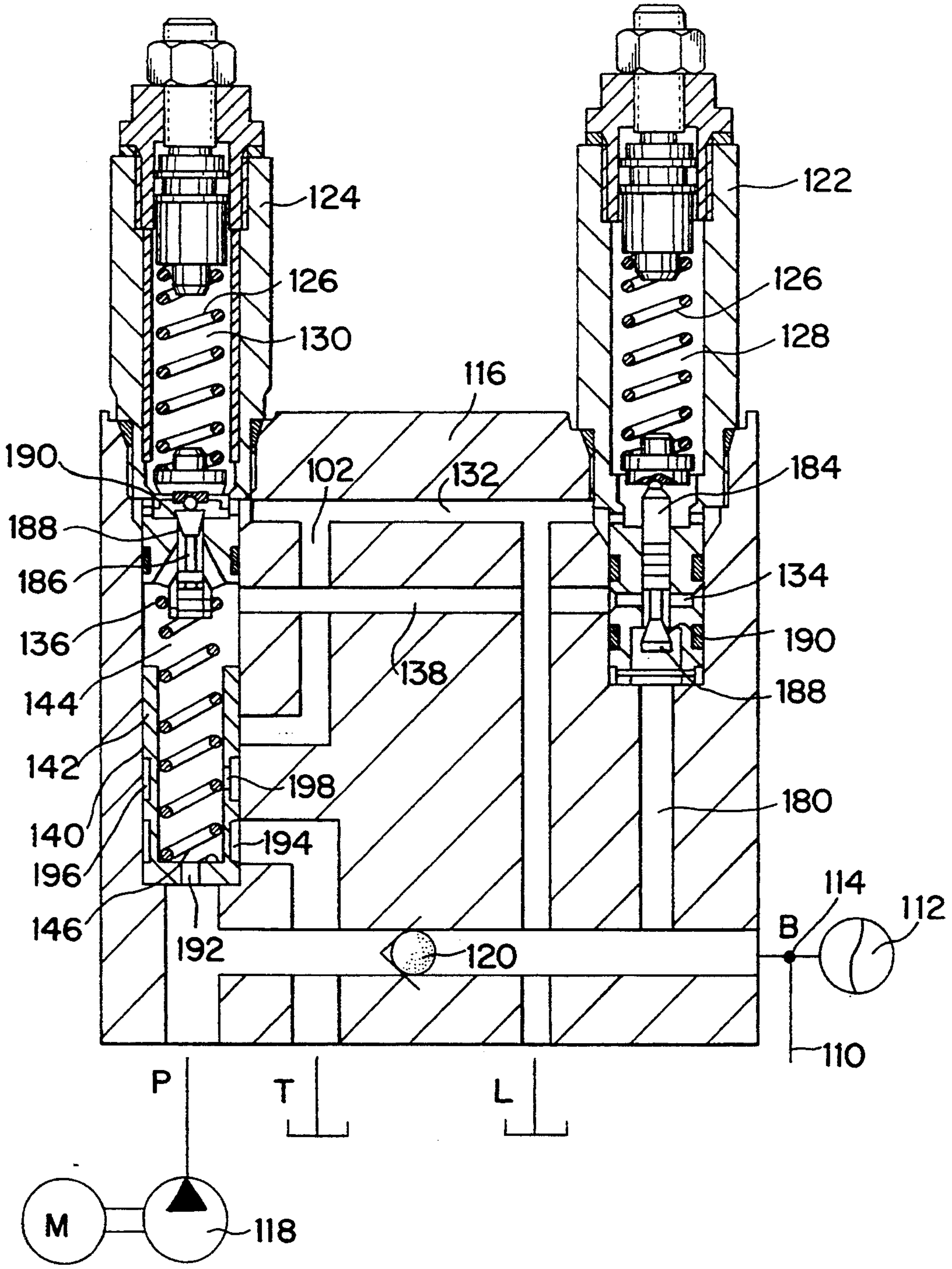

The accumulator charging valve according to the invention is described in detail hereafter with reference to two embodiments according to FIGS. 1 and 2.

The first embodiment of the accumulator charging valve according to the invention, according to FIG. 1, is connected by way of the control connection B to a hydraulic system 10, of which, for the purpose of simplification in FIG. 1, only the hydraulic accumulator 12 and the supply line are illustrated diagrammatically, which supply line leads away from the branch point 14.

Besides the control connection B, which leads partly into the valve body 16 of the accumulator charging valve, the latter also comprises an outlet T, which leads to a tank, and an inlet P, Which is connected to a hydraulic pump 18, able to be driven by way of a motor M, which pump is of conventional construction and therefore not described in detail. Connected between the inlet P and the control connection B is a check valve in the form of a non-return valve 20, which closes in the direction of the inlet P.

Located on the valve body 16 are two anticipatory control valves 22 and 24, the anticipatory control valve 22 having a pressure-closing function and the anticipatory control valve 24 a pressure-limiting function. The lower or upper charging pressure or switching point in the hydraulic system 10 can thus be adjusted by these two anticipatory control valves 22 and 24. The relevant adjustment respectively takes place by way of a displaceable governing spring 26, which is guided in the valve body of the respective anticipatory control valve 22, 24. The construction and the method of operation of the relevant anticipatory control valves 22, 24 are generally known to the technical world and are therefore not described again in detail.

The rear valve chambers 28 and 30 of the two anticipatory control valves 22 or 24 are connected to each other by way of a transverse bore 32. Branching from this transverse bore 32 is a leakage oil line L (shown in cut-off view), which opens into a leakage oil collecting point. At least on the end side, in the region of the leakage oil collection point, this leakage oil line L is at substantially atmospheric pressure, which facilitates the discharge of the leakage oil. However, the leakage oil line L may also be connected to the outlet T, which opens into the tank and which accordingly may have a higher pressure than atmospheric pressure. The two front valve chambers 34 and 36 of the two anticipatory control valves 22 or 24 are likewise connected to each other by way of a transverse connection 38 in the form of a bore.

A control piston 42 is arranged to slide longitudinally in a piston chamber 40 extending transversely in the valve body 16. The inlet P as well as the outlet T open into this piston chamber 40. Together with the wall of the piston chamber 40, the inside of the control piston 42 surrounds a control chamber 44, in which a piston spring 46 is located, which cooperating with a valve ball 48 forms a non-return valve designated generally by the reference numeral 50. In its state actuated by way of the pressure in the inlet P, the non-return valve 50 serves for producing a connection between the inlet P and the control chamber 44, which on its end face comprises a branch 52, which opens into the front valve chamber 36 of the second anticipatory control valve 24. At its end opening into the atmosphere, the piston chamber 40 is closed by means of a hexagonal screw 54 and opens by its other opposite end into a travelling chamber 56 of comparable size. In place of the valve ball 48, another correspondingly suitable closing member can also be used, for example in the form of a cone-shaped or plate-shaped component or the like.

Arranged to slide in this travelling chamber 56 is a closing piston 58, which as part of the separating device according to the invention cooperates with the control piston 42 and with the latter forms a pressure maintaining valve. The closing piston 58 consisting essentially of a steel material comprises peripheral grooves 60 distributed at predetermined distances apart along its periphery, which grooves act as lubricating grooves and allow troublefree displacement of the closing piston 58. In its position illustrated in FIG. 1, the closing piston 58 abuts by its one end against a closing screw 62, which closes off the travelling chamber 56 towards the outside. At its other end remote from the closing screw 62, the closing piston 58 comprises a cylindrical connection 64 which is connected in one piece to the closing piston 58 and which at its end facing the control piston 42 supports a web 66. This web 66 overlaps the continuous bore 68 located in the control piston 42, which produces the connection between the control chamber 44 and the inlet P and which according to the basic position of the non-return valve 50 shown in FIG. 1, is closed by its valve ball 48. In this case, the two free, opposing ends of the web 66 rest on the end face of the control piston 42, in which case two opening regions of the bore 68 separated by the web 66 are constantly connected to the inlet P.

For the hermetic sealing of the connection between the control connection B and the outlet T, the separating device comprises, in the closing piston 58, on its working surface 70 facing the control piston 42, a closing part in the form of a conically constructed closing surface 72, which upon the displacement of the closing piston 58, seen in FIG. 1, towards the left, can be brought into abutment with a stationary part in the form of a conical seat surface 74 adapted to the closing surface 72, which surface 74 is located in the travelling chamber 56 and defines the latter on its end face. In the present embodiment, the sealing part of the separating device thus consists of the travelling closing part in the form of the closing surface 72 and of the seat surface 74 constructed as a stationary part, which can both be brought into hermetic abutment one with the other. The working surface 76 of the closing piston 58, which surface is remote from the control piston 42, defines a part 78 of the travelling chamber 56 of somewhat enlarged diameter, into which a branch 80 located between the check valve in the form of the non-return valve 20 and the control connection B as well as a connecting line 82 opens, which leads to the first anticipatory control valve 22.

In addition to the afore-discussed sealing part in the closing piston 58, the accumulator charging valve according to the invention also comprises two further sealing parts in the two valve rockers 84 and 86 of the two anticipatory control valves 22 or 24, which each have a conical closing surface 88 on the end face, which cooperate with a stationary part in the form of a seat edge 90, which is part of the valve housing of the two anticipatory control valves 22 and 24. In this case, the valve rocker 84 of the first anticipatory control valve 22 can release or block the path between the connecting line 82 to the front valve chamber 34. On the other hand, the valve rocker 86 of the second anticipatory control valve 24 establishes the connection between the front valve chamber 36 and the rear valve chamber 30 or separates the latter from each other.

For a better understanding of the accumulator charging valve according to the invention, its operation will be described in detail hereafter with reference to the first embodiment.

In the basic position of the accumulator charging valve illustrated in FIG. 1, if, driven by way of the motor M, the hydraulic pump 18 conveys pressure medium by way of the inlet P and the non-return valve 20, which then accordingly opens, namely pressure medium into the accumulator circuit and thus into the hydraulic system 10, in this case the control piston 42 and the closing piston 58 are largely pressure-equalized and are retained by way of the piston spring 46 in their position shown in FIG. 1. As is made clear in FIG. 1, in this case the inlet P is separated from the outlet T and the first anticipatory control valve 22 is opened, whereas the second anticipatory control valve 24 is closed. A connection between the control connection B and the transverse connection 38 is thus established by way of the first anticipatory control valve 22, whereas the connection between the branch 52 and transverse bore 32 is interrupted by way of the second anticipatory control valve 24.

Due to the progressive pressure rise in the hydraulic system 10 and in the hydraulic accumulator 12, the first anticipatory control valve 22 first of all adjoins the seat edge 90. The pressure in the inlet P opens the non-return valve 50 and fluid flows by way of the bore 68, the control chamber 44 and the branch 52, which fluid opens the second anticipatory control valve 24 at the point of its seat edge 90.

The control chamber 44 of the control piston 42 is thus restricted by means of the second anticipatory control valve 24 to its predetermined pressure, which in this case differs from the value zero, which upon actuation of the second anticipatory control valve 24 then drops, the two-part pressure maintaining valve, formed from the control piston 42 and the closing piston 58 no longer being pressure-equalized, so that the closing piston 58 by way of the connection 64 and the web 66 pushes the control piston 42, seen in FIG. 1, under the influence of the upper charging pressure prevailing in the control connection B, against the action of the piston spring 46, towards the left. In this switching position adopted on the left hand side, the closing piston 58 presses by its closing surface 72 against the seat surface 74 of the travelling chamber 56 and thus seals the connection between the control connection B and the outlet T in a non-leaking manner. In this case, the control piston 42 itself releases the connection between the inlet P and outlet T and closes the non-return valve 20, so that the hydraulic accumulator 12 of the hydraulic system 10 is constantly charged to the upper charging pressure and the hydraulic pump 18 conveys hydraulic oil from the inlet P directly to the outlet T, with a low pressure difference.

Thus, in contrast to the prior art, in the switching position of the accumulator charging valve according to the invention adopted here, a completely non-leaking closing of the hydraulic system 10 is achieved. If a removal of oil in the hydraulic system 10 occurs, the pressure on the charging pressure side, thus in the control connection B, can drop until, in the anticipatory control valve 22 on account of the spring force of the governing spring 26, by way of the valve rocker 84, the closing surface 88 lifts from the seat edge 90 and thus opens this valve. Due to this, hydraulic oil passes from the control connection B into the transverse connection 38 and by way of the front valve chamber 36 and the branch 52 to the spring-loaded side of the control piston 42.

The pressure then prevailing in the control chamber 44 closes the non-return valve 50 and on account of the pressure-equalizing unit between the so called spring chamber side and the charging pressure side, seen in FIG. 1, the piston 42 moves towards the right. The piston spring 46 thus pushes the control piston 42 and thus the closing piston 58 back into the basic position shown in FIG. 1, if the adjustable charging pressure has fallen below its lower limit value, the control piston 42 again separating the inlet P from the outlet T and the charging cycle taking place again from the inlet P to the control connection B. The control piston 42 and the closing piston 58 have approximately the same size ratios, in particular their outer diameter is the same. Furthermore, their longitudinal axes lie substantially on a common line. The seat diameter formed by the seat surface 74 in the travelling chamber 56 is smaller than the outer diameter of the piston of the closing piston 58 measured at the point where it is in abutment with the travelling chamber 56. Due to this, at the time of the aforedescribed return process, in addition to the force of the piston spring 46, a force component results, which results from the given diameter difference and the respectively prevailing return pressure, which facilitates the release of the closing surface 72 from the seat surface 74 and thus the travel of the closing piston 58, seen in FIG. 1, towards the right. As soon as the seat surface 72 has released from the seat surface 74, the aforediscussed surface ratio no longer plays a part and the two pistons are once again pressure-equalized.

The second embodiment of an accumulator charging valve according to the invention will be described only in so far that it differs essentially from the first described embodiment. In this case, components relating to the second embodiment, which correspond to the components of the first embodiment, are provided with the same reference numerals, but which are increased by 100.

In the second embodiment illustrated in FIG. 2, the closing piston 58 is dispensed with and only the control piston 142 is used. The piston spring 146, which is located inside the control chamber 144, bears by one end directly against the control piston 142 and by its other end against the second anticipatory control valve 124. In this case, the piston chamber 140 is incorporated longitudinally in the accumulator charging valve and the branch 52 is dispensed with, since the control chamber 144 opens directly into the front valve chamber 136 of the second anticipatory control valve 124.

Located on the end face in the control piston 142 is a continuous nozzle 192 forming a restrictor, which constantly connects the inlet P to the control chamber 144. The piston spring 146 attempts to hold the control piston 142 in its basic position illustrated in FIG. 2. In this case, an annular groove 194 constructed as a lubricating groove, which extends along the outer periphery of the control piston 142, at least partly coincides with the outlet T. A further second annular groove 196 is located between the annular groove 194 and the end of the control piston 142 facing the second anticipatory control valve 124, along its outer periphery, so that in the basic position illustrated in FIG. 2, this peripheral annular groove 196 is completely covered by the valve wall of the valve body 116. If the control piston 142 is moved out of its basic position illustrated in FIG. 2, seen in FIG. 2 from the bottom upwards, into its other end position, then by way of a transverse bore 198, which is located in the base of the second annular groove 196, a connection is established between the control chamber 144 and a connecting line 102 extending in the valve body 116, which connecting line 102 opens into the upper transverse bore 132. Due to the transverse bore 198 and the second annular groove 196, the control piston 142 thus has a passage, which opens into the control chamber 144 and which can be connected to the leakage oil line L by way of the connecting line 102.

In this second embodiment of the accumulator charging valve according to the invention, on reaching the upper charging pressure, the separating device with its respective sealing part is formed from the first anticipatory control valve 122 and the check valve in the form of the non-return valve 120 located between the inlet P and the control connection B.

In order to clarify the teaching according to the invention, the method of operation of this second embodiment will be described in detail hereafter.

During the charging process, the pump 118 once again conveys fluid by way of the incorporated non-return valve 120 into the accumulator circuit of the hydraulic system 110. In this case, the control piston 142 is pressure-equalized and is located in the basic position illustrated in FIG. 2, determined by the piston spring 146. In this case the inlet P is separated from the outlet T and the first anticipatory control valve 122 is opened, whereas the second anticipatory control valve 124 is closed. Due to the pressure rise in the hydraulic system 110 and in the hydraulic accumulator 112, first of all the anticipatory control valve 122 closes and on reaching the upper charging pressure, the second anticipatory control valve 124 opens due to the pressure prevailing in the control chamber 144, which results from the supply of fluid through the inlet P behind the nozzle 192. A pressure drop occurs in the control chamber 144 of the control piston 142 and the latter is displaced due to the pressure prevailing in the inlet P, against the force of the piston spring 146 serving as restoring means, seen in FIG. 2, upwards in its opening direction. With the release of the connection from the inlet P to the outlet T, the spring side of the control piston 142 is relieved of pressure by way of the second annular groove 196, the transverse bore 198, the connecting line 102, the transverse bore 132 as well as the leakage oil line L towards the leakage oil collecting point. Due to this, the control piston 142 is finally opened against the action of the piston spring 146.

The pressure prevailing in the leakage oil line L is then mainly present on the spring side of the control piston 142, since the oil flowing continuously through the nozzle 192 can once more flow by way of the afore-discussed passage 196, 198 to the largely pressure-less side. The hydraulic system 110 is then charged to the upper charging pressure and the pump 118 conveys fluid from the inlet P to the outlet T, with a low pressure loss.

The accumulator pressure prevailing in the hydraulic system 110 then acts on the non-return valve 120 and on account of its sealing action, the first anticipatory control valve 122 however has no connection to the control piston 142 and thus to the outlet T. Due to the arrangement according to the second embodiment of the accumulator charging valve according to the invention, thus, once again, inside the valve in the range between the lower and the upper charging pressure, a completely non-leaking shutting-off of the hydraulic system 110 is facilitated.

If oil is removed from the hydraulic system 110, the pressure drops until the spring force of the governing spring 126 preset at the anticipatory control valve 122 actuates, the valve rocker 184 and thus lifts the closing surface 188 from the seat edge 190 for the purpose of opening the valve. By way of the first anticipatory control valve 122 opened in this way, control oil then flows by way of the control connection B once again via the associated connecting line 138 into the control chamber 144, which together with the piston spring 146 moves the control piston 142 downwards into its closing position illustrated in FIG. 2, the relief of the rear side of the piston towards the leakage oil side being closed. Furthermore, the connection from the inlet P to the outlet T is separated and the charging cycle from the inlet P to the control connection B can begin again until the adjustable upper charging pressure is reached.

After reaching the upper charging pressure, the pump 118 conveys fluid from P to T, with a low pressure loss. Due to the removal of oil, the pressure in the hydraulic system drops, however it remains constant above the lower charging pressure.

If the pump is switched off, then on account of the failing conveyance of oil by the pump, the piston spring 146 pushes the control piston 142 back into its initial position.

If the pump 118 is switched on again, the latter conveys fluid by way of the non-return valve 120 into the hydraulic accumulator 112, which is charged to the upper charging pressure.

In the afore-discussed non-return valves 20, 120, the respectively displaceable closing part is formed from the rounded closing surface of a valve ball, which can be brought into sealing abutment with a stationary, annular seat edge on the valve body.

The preceding Description and the drawings are restricted solely to the representation of features which are essential for the exemplary embodiment of the invention.

Therefore, in so far that features are disclosed in the Description and in the drawings and are not mentioned in the claims, the latter necessarily also serve for defining the object of the invention.

We claim:

1. An accumulator charging valve for connecting an inlet to an outlet of a hydraulic system when an adjustable upper charging pressure in the hydraulic system is reached and for separating the inlet from the outlet when an adjustable lower charging pressure is reached, comprising:

a valve body having inlet means for coupling a fluid pressure source to said valve body, outlet means for coupling an outlet to said valve body and control connection means for coupling a hydraulic system to said valve body;

a first conduit in said valve body connecting said inlet means and said outlet means;

a control piston movably mounted in said valve body between a first switching position blocking connection of said inlet means and said outlet means and a second position opening connection of said inlet means and said outlet means, said control piston being coupled to restoring means for biasing said control piston toward said first position;

a separating means including a first adjustable piloting valve for separating said control connection means from said outlet means and for adjusting the lower charging pressure;

a second conduit in said valve body connecting said inlet means and said control connection means and extending between said control connection means and said outlet means;

a check valve located in said second conduit between said inlet means and said control connection means, said first adjustable piloting valve and said check valve forming a tight seal for a leak point between said control connection means and said outlet means when the adjustable upper charging pressure is attained, said check valve controlling connection of said control connection means to said outlet means;

a control chamber in said valve body for said control piston, said control piston having a passage opening into said control chamber;

means in said valve body for connecting said passage to a leak line;

a third conduit connecting said control chamber with said inlet means; and a second piloting valve for adjusting the upper charging pressure and maintaining a predetermined pressure in said control chamber.

2. An accumulator charging valve according to claim 1 wherein said third conduit comprises a nozzle seated in said control piston.

3. An accumulator charging valve according to claim 2 wherein said check valve closes in a direction of said inlet means; and a branch, located between said check valve and control connection means, leads from said second conduit to said first piloting valve.

4. An accumulator charging valve according to claim 2 wherein said control piston comprises a passage opening into said control chamber; and said valve body comprises means for connecting said passage to a leak line.

5. An accumulator charging valve according to claim 1 wherein said third conduit comprises a non-return valve located in said control chamber.

6. An accumulator charging valve according to claim 5 wherein said check valve closes in a direction of said inlet means; and a branch, located between said check valve and control connection means, leads from said second conduit to said first piloting valve.

7. An accumulator charging valve according to claim 6 wherein said control piston comprises a passage opening into said control chamber; and said valve body comprises means for connecting said passage to a leak line.

8. An accumulator charging valve according to claim 5 wherein said control piston comprises a passage opening into said control chamber; and said valve body comprises means for connecting said passage to a leak line.

9. An accumulator charging valve according to claim 1 wherein said check valve closes in a direction of said inlet means; and a branch, located between said check valve and control connection means, leads from said second conduit to said first piloting valve.

* * * * *